(12) United States Patent
Chuang

(10) Patent No.: US 8,262,834 B2
(45) Date of Patent: Sep. 11, 2012

(54) METHOD FOR MANUFACTURING LENS

(75) Inventor: Hsin-Hung Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 942 days.

(21) Appl. No.: 12/202,598

(22) Filed: Sep. 2, 2008

(65) Prior Publication Data

US 2009/0267247 A1    Oct. 29, 2009

(30) Foreign Application Priority Data

Apr. 28, 2008 (CN) .......................... 2008 1 0301322

(51) Int. Cl.
   *B29C 65/00*   (2006.01)
(52) U.S. Cl. .................................... 156/272.2
(58) Field of Classification Search ............... 156/272.2, 156/272.6, 273.3, 99, 102; 264/1.36
See application file for complete search history.

(56) References Cited

U.S. PATENT DOCUMENTS

| | | | |
|---|---|---|---|
| 6,305,194 B1 * | 10/2001 | Budinski et al. ................. 65/105 |
| 2003/0095340 A1 * | 5/2003 | Atwater et al. ............... 359/742 |
| 2004/0112518 A1 * | 6/2004 | Rossier et al. ............. 156/272.2 |
| 2007/0153384 A1 * | 7/2007 | Ouderkirk et al. ............ 359/500 |

FOREIGN PATENT DOCUMENTS

| | | | |
|---|---|---|---|
| JP | 2004110052 A | * | 4/2004 |
| WO | 2008/007787 A1 | | 1/2008 |

OTHER PUBLICATIONS

Machine translation of JP 2004110052 A, Apr. 2004.*
Shen De-Xin, Zhang Feng, Zhang Chun-Quan, Luo Zhong-Zi, Chen Zhi-Yang, Zhou Yong-Liang, Surface Modification and Bonding of Poly(dimethylsiloxane) by Oxygen Plasma Treatment under Medium Vacuum, Journal of Xiamen University (Natural Science), Nov. 2005, pp. 792-795, vol. 44 No. 6, China.

* cited by examiner

*Primary Examiner* — Daniel McNally
(74) *Attorney, Agent, or Firm* — Altis Law Group, Inc.

(57) ABSTRACT

An exemplary a method for manufacturing a lens is provided. In the method, a first lens preform and a second lens preform is formed. The first lens preform includes a first surface and an opposite second surface. The second lens preform includes a third surface and an opposite fourth surface. An oxygen plasma is applied to the second and fourth surfaces so as to form a number of groups capable of being irreversibly bonded. The second surface is contacted with the fourth surface. The groups capable of being irreversibly bonded take place an irreversible bonding reaction to chemically combine the second and fourth surfaces, thereby obtaining a double sided lens preform. The double sided lens preform is diced into a number of double side lenses.

12 Claims, 6 Drawing Sheets

METHOD FOR MANUFACTURING LENS

CROSS REFERENCE TO RELATED APPLICATION

This application is related to commonly-assigned copending application Ser. No. 12/138,275, entitled "METHOD FOR MANUFACTURING FILM COATED COMPOSITE LENS". Disclosures of the above-identified application are incorporated herein by reference.

BACKGROUND

1. Technical Field

The present invention relates to lenses, and particularly to a method for manufacturing a double sided lens.

2. Description of Related Art

Soft lithography refers to a family of techniques for fabricating or replicating structures. It is called "soft" because it uses elastomeric materials, most notably polydimethylsiloxane (PDMS). Soft lithography is generally used to construct structures measured on the micrometer to nanometer scale. Generally, soft lithography includes the technologies of micro contact printing (MCP), replica molding (REM), microtransfer molding (MTM), micromolding in capillaries (MIMIC) and solvent-assisted micromolding (SAMIM).

Typically, in replica molding technology, a molten macromolecule material is directly cast on a molding surface of a mold. After curing, the mold is removed, thereby obtaining a polymer article with a micro- or nano-structure corresponding to the molding surface. However, the polymer article has the micro- or nano-structure only on one surface thereof. The replica molding technology cannot be used to directly manufacture a polymer article having a micro- or nano-structure on two opposite surfaces thereof at one time. Thus, it is difficult to manufacture a double sided lens using the replica molding technology as described above.

What is needed, therefore, is a method for manufacturing double sided lens with excellent optical properties.

SUMMARY

One present embodiment provides a method for manufacturing a lens. In the method, firstly, a first lens preform and a second lens preform comprising a polymer are formed. The first lens preform includes a first surface and an opposite second surface. The first surface has a number of first lens structures formed thereon. The second lens preform includes a third surface and an opposite fourth surface. The third surface has a number of second lens structures formed thereon. The fourth surface is formed to mate with the second surface. Secondly, an oxygen plasma is applied to the second surface and the fourth surface so as to form a number of groups for being irreversibly bonded to each other. Thirdly, the second surface is contacted with the fourth surface with an optical axis of each of the first lens structures aligned with the optical axis of a corresponding second lens structures. The second surface is contacted with the fourth surface obtaining a permanent bond, thereby obtaining a double sided lens preform. Fourthly, the double sided lens preform is cut into a number of double side lenses. Each of the double sided lens includes one of the first lens structures and one of the second lens structures.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Referring to FIG. 1 to FIG. 4, an exemplary method for manufacturing a number of double sided lenses includes the following steps.

Step 1: a mold 10 is provided.

Figure 1:
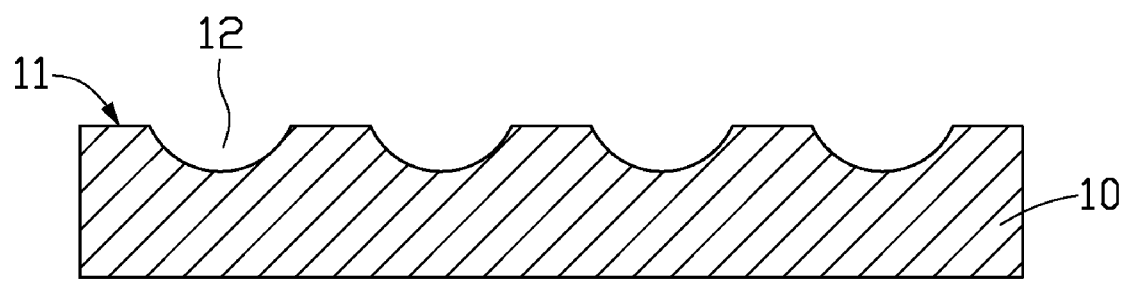
FIG. 1 is a schematic, cross-sectional view of a mold according to a present embodiment.

Referring to FIG. 1, the mold 10 includes a molding surface 11. The molding surface 11 defines a number of microstructures 12 thereon. The microstructures 12 are arranged in an array. The microstructures 12 are configured for molding a number of optical articles such as optical portions of lenses. The microstructures 12 can be either convex structures or concave structures. The convex surfaces or the concave surfaces of the microstructures 12 can be spherical or aspherical. In the present embodiment, the microstructures 12 defined on the molding surface 11 are concave structures and have aspherical surfaces.

The mold 10 is comprised of a material selected from a group consisting of plastic and metal. In the present embodiment, the mold 10 is comprised of aluminum.

Figure 3:
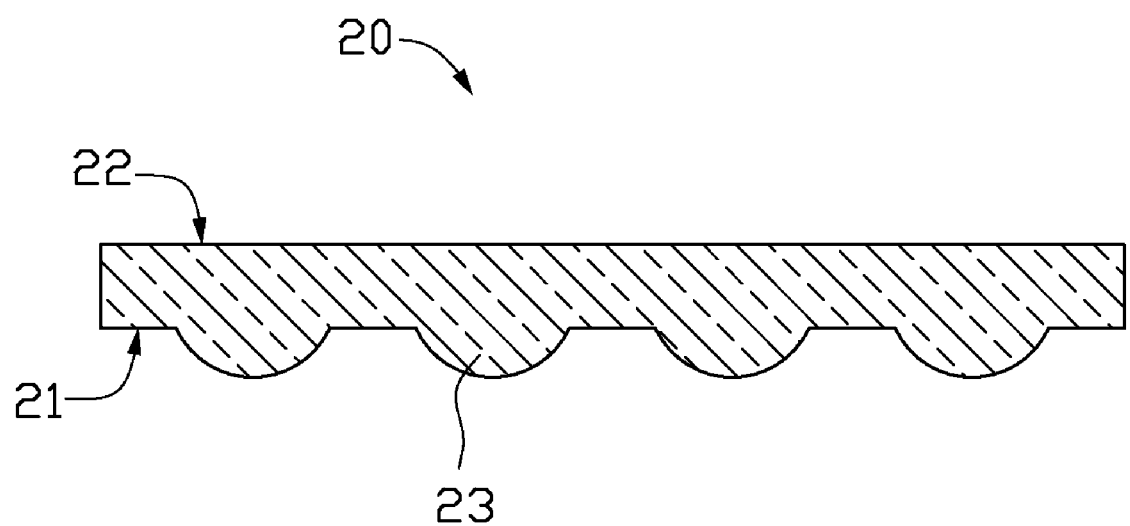
FIG. 3 is a schematic, cross-sectional view of a first lens preform according to the present embodiment.
Figure 4:
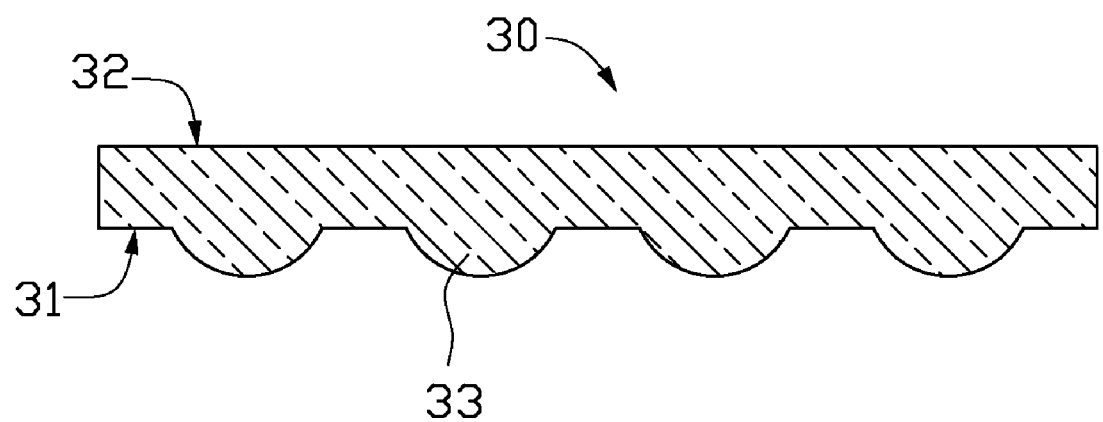
FIG. 4 is a schematic, cross-sectional view of a second lens preform according to the present embodiment.

Step 2: a first lens perform 20 and a second lens perform 30 are formed, as shown in FIG. 3 and FIG. 4.

Figure 2:
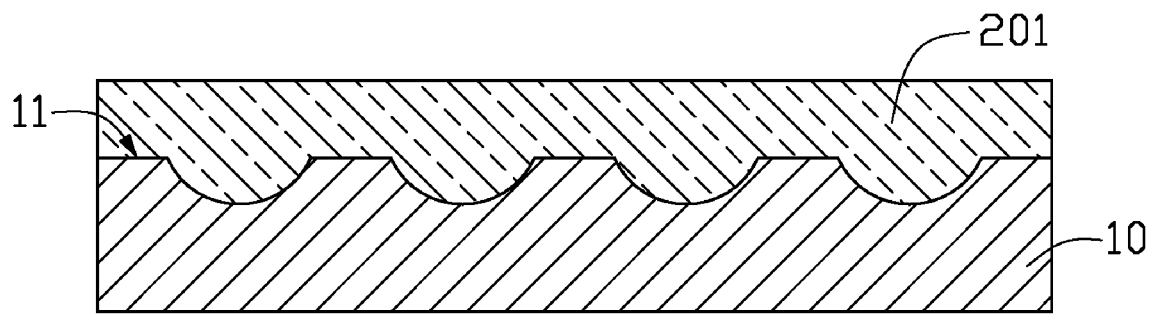
FIG. 2 is a schematic, cross-sectional view of a molten macromolecule material cast on a molding surface of the mold shown in FIG. 1.

Referring to FIG. 2, a molten macromolecule material 201 is directly cast on the molding surface 11 of the mold 10. Then, the material 201 is cured to form a polymer lens preform. The mold 10 is removed from the lens preform. As a result, the obtained lens preform has lens structures corresponding to the microstructures 12 of the molding surface 11 defined thereon. The macromolecule material 201 can be a polymer selected from a group consisting of polydimethylsiloxane (PDMS), polymethylmethacrylic (PMMA), and polyethylene terephathalate (PET).

In the present embodiment, the molten macromolecule material 201 of PDMS is cast on the molding surface 11 of the mold 10 using a spin coating method. Then the mold 10 is heated for about 15 minutes to cure the material 201. Referring to FIG. 3, the mold 10 is removed from the cured material 201 to obtain the first lens preform 20 comprised of PDMS. Similarly, referring to FIG. 4, the second lens preform 30 is also formed using the mold 10. The first lens preform 20 and the second lens preform 30 have an identical configuration in the present embodiment.

It is noted that the first and second lens preforms 20, 30 can be formed using other soft lithography technologies such as MCP, MTM, MIMIC and SAMIM.

The first and second lens preforms 20, 30 are a singled-sided lens preforms and include first surfaces 21, 31, second surfaces 22, 32 on opposite side from the first surfaces 21, 31. The first surfaces 21, 31 respectively have a number of first and second lens structures 23, 33 corresponding to the microstructures 12 on the molding surface 11 of the mold 10. In the present embodiment, the first and second lens structures 23, 33 are arranged in arrays corresponding to the microstructures 12. The first and second lens structures 23, 33 are convex structures corresponding to the concave structures of the microstructures 12. The second surfaces 22, 32 are substantially planar and configured to be permanently bonded to each other.

It is noted that the first lens preform 20 can be different from the second lens preform 30. For example, the second lens structures 33 can be concave structures. For another example, the second surfaces 22, 32 can be curved matable surfaces.

Step 3: an oxygen plasma is applied to the first and second lens preforms 20, 30.

In the present embodiment, the oxygen plasma is applied to the second surfaces 22, 32. As a result, a number of groups containing alkyl of the polymer on the second surfaces 22, 32 are transformed to a number of groups containing hydroxyl to allow permanent bonding. For example, in the present embodiment, the first lens and second preforms 20, lens preform 30 is comprised of PDMS. The PDMS on the second surfaces 22, 32 contain hydrophobic Si—$CH_3$. When the oxygen plasma is applied to the PDMS on the second surfaces 22, 32, a number of oxygen free radicals in the oxygen plasma react with Si—$CH_3$, thereby forming a number of hydrophobic Si—OH groups capable of being irreversibly bonded when contacted with each other. The Si—OH groups can undergo an irreversible bonding reaction (condensation reaction), thereby forming a number of high-strength Si—O—Si covalent bonds.

The oxygen plasma is applied to the second surfaces 22, 32 in a vacuum oxygen plasma processor. A voltage to operate the vacuum oxygen plasma processor is in a range from 1400 volts to 2000 volts. In this embodiment, the voltage is in a range from 1500 volts to 1600 volts. A time of applying the oxygen plasma to the second surfaces 22, 32 is in a range from 60 seconds to 70 seconds.

Step 4: a double sided lens preform 40 is formed.

Figure 5:
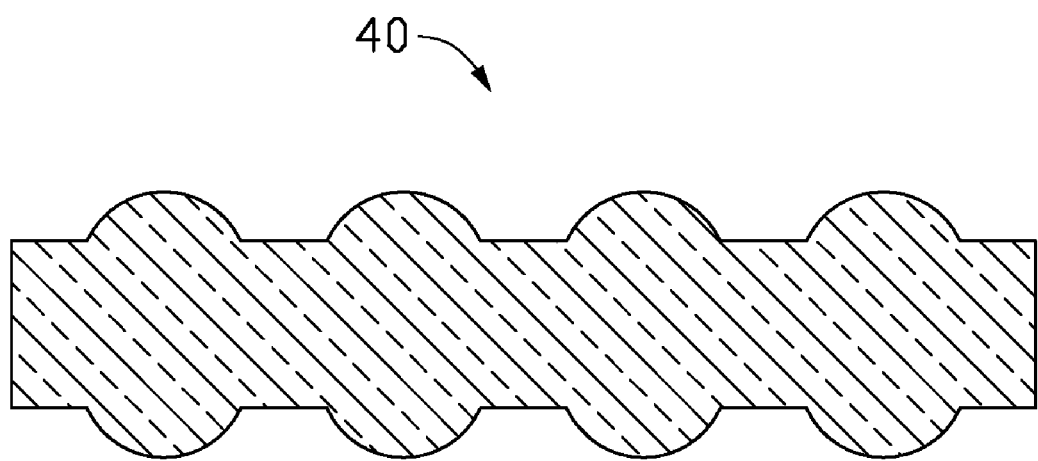
FIG. 5 is a schematic, cross-sectional view of a double sided lens preform according to the present embodiment.

The second surfaces 22, 32 are contacted with each other forming permanent bonds such that optical axes of the first lens structures 23 aligned with the optical axes of the corresponding second lens structures 33. Thereby obtaining the double sided lens preform 40, referring FIG. 5.

It is noted that after the second surface 22, 32 are treated with the oxygen plasma, they should be contacted with each other as soon as possible, in this embodiment contact is made within lens perform lens preform 3 minutes.

The combination of the first lens preform and second lens preforms 20, 30 are then heated to a temperature lens preform lens preform in a range from 90 to 120 Celsius degrees 1.5 to 2 hours, thus curing the bonds to further enhance strength of the bonding between the second surfaces 22, 32.

Figure 6:
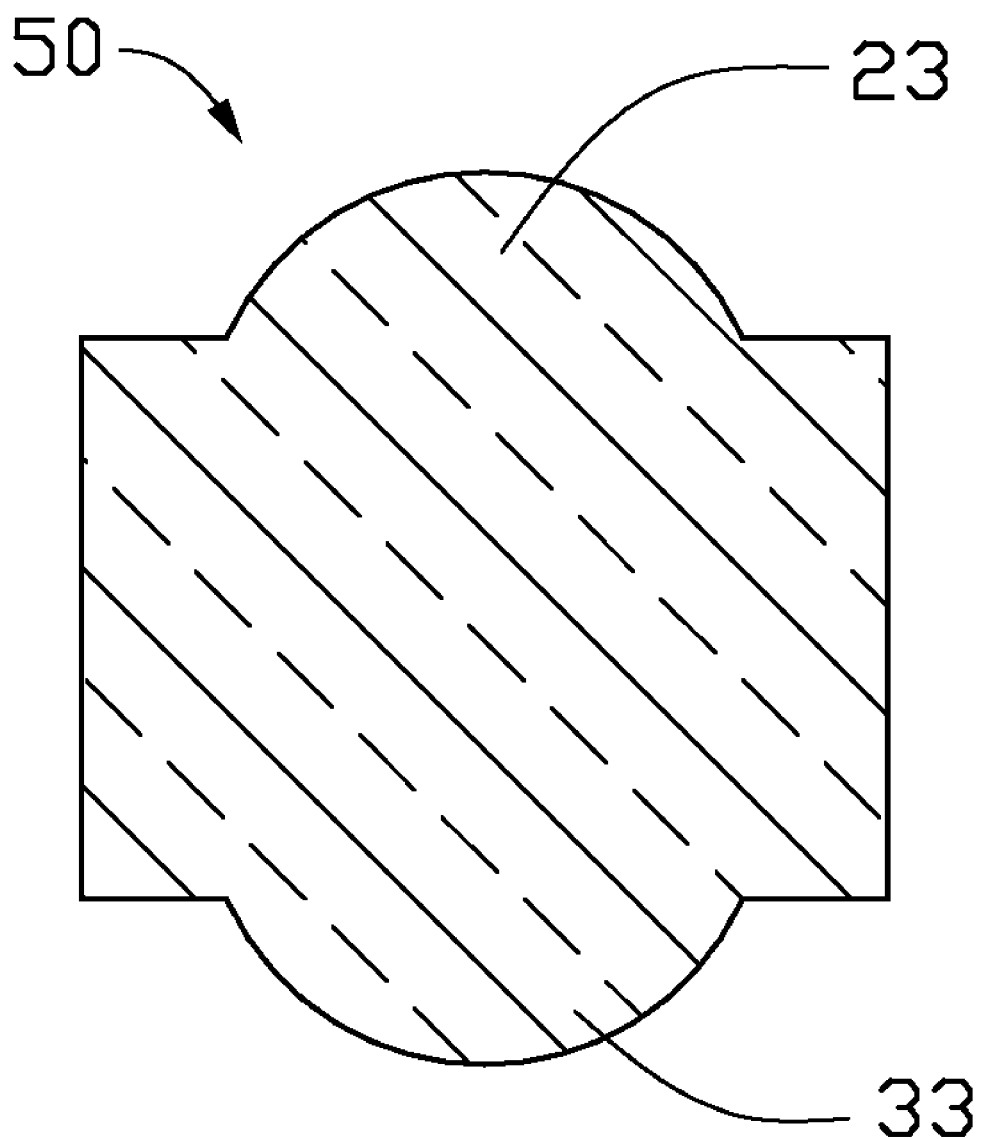
FIG. 6 is a schematic, cross-sectional view of a double sided lens according to the present embodiment.

Step 5: the double sided lens preform 40 is then cut to form a number of double sided lens 50 as seen in FIG. 6.

Each of the double sided lens 50 includes one of the first lens structures 23 and one of the second lens structures 33.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for manufacturing a lens, comprising the steps of:
    forming a first lens preform and a second lens perform, the first and second lens preform comprised of polymer, the first lens preform comprising a first surface and an opposite second surface, the first surface having a plurality of first lens structures formed thereon, the second lens preform comprising a third surface and an opposite fourth surface, the third surface having a plurality of second lens structures corresponding to the first lens structures;
    applying an oxygen plasma to the second surface to form a plurality of first groups for being irreversibly bonded to the fourth surface;
    applying an oxygen plasma to the fourth surface to form a plurality of second groups for being irreversibly bonded to the second surface; wherein an electrical pressure configured for generating the oxygen plasma is in a range from 1400 volts to 2000 volts, a time period for applying the oxygen plasma to the second surface and the fourth surface is in a range from 60 seconds to 70 seconds;
    bringing the second surface into contact with the fourth surface with an optical axis of each of the first lens structures aligned with the optical axis of a respective second lens structures,
    heating the first lens preform and the second lens perform to a temperature in a range from 90 to 120 Celsius degrees for a time in a range from 1.5 hours to 2 hours, and causing an irreversible bonding reaction between the first and second groups to chemically combine the second surface with the fourth surface, thereby obtaining a double sided lens perform, wherein a period from finishing applying the oxygen plasma to starting to bring the second surface and the fourth surface into contact with each other is less than 5 minutes; and
    dicing the double sided lens preform into a plurality of double side lenses, each of the double sided lens comprising one of the first lens structures and one of the second structure.

2. The method of claim 1, wherein the first lens preform and the second lens preform are formed using a soft lithography technique.

3. The method of claim 2, wherein the first lens preform and the second lens preform are formed using a replica molding method.

4. The method of claim 3, wherein the replica molding method comprises the steps of: providing a mold having a molding surface, the molding surface comprising a plurality of predefined structures thereon; casting a melted polymer material on the molding surface; curing the melted polymer material to form a first or second lens preform; and removing the mold.

5. The method of claim 3, wherein the first lens structures are arranged in an array, and the second lens structures corresponds to the first lens structures and are arranged in an array.

6. The method of claim 1, wherein the polymer includes polydimethylsiloxane.

7. The method of claim 6, wherein the first and second groups comprises a plurality of Si—OH groups.

8. The method of claim 6, wherein the second surface and the fourth surface each are substantially a plane surface.

9. The method of claim 1, wherein the polymer includes polymethylmethacrylic.

10. The method of claim 1, wherein the polymer includes polyethylene terephathalate.

11. The method of claim 1, wherein an electrical pressure configured for generating the oxygen plasma is in a range from 1500 volts to 1600 volts.

12. The method of claim 1, wherein a period from finishing applying the oxygen plasma to starting to bring the second surface and the fourth surface into contact with each other is less than 3 minutes.

* * * * *